(No Model.) 3 Sheets—Sheet 1.

H. H. CUMMINGS.
SPEED CHANGING AND REVERSING MECHANISM.

No. 529,713. Patented Nov. 27, 1894.

Witnesses.
Edward F. Allen.
Thomas J. Drummond.

Inventor.
Henry H. Cummings,
by Crosby & Gregory, Attys.

THE NORRIS PETERS CO., PHOTO-LITHO., WASHINGTON, D. C.

(No Model.) 3 Sheets—Sheet 2.

H. H. CUMMINGS.
SPEED CHANGING AND REVERSING MECHANISM.

No. 529,713. Patented Nov. 27, 1894.

Witnesses.
Fred S. Greenleaf.
Thomas J. Drummond

Inventor:
Henry H. Cummings
by Crosby & Gregory
Attys.

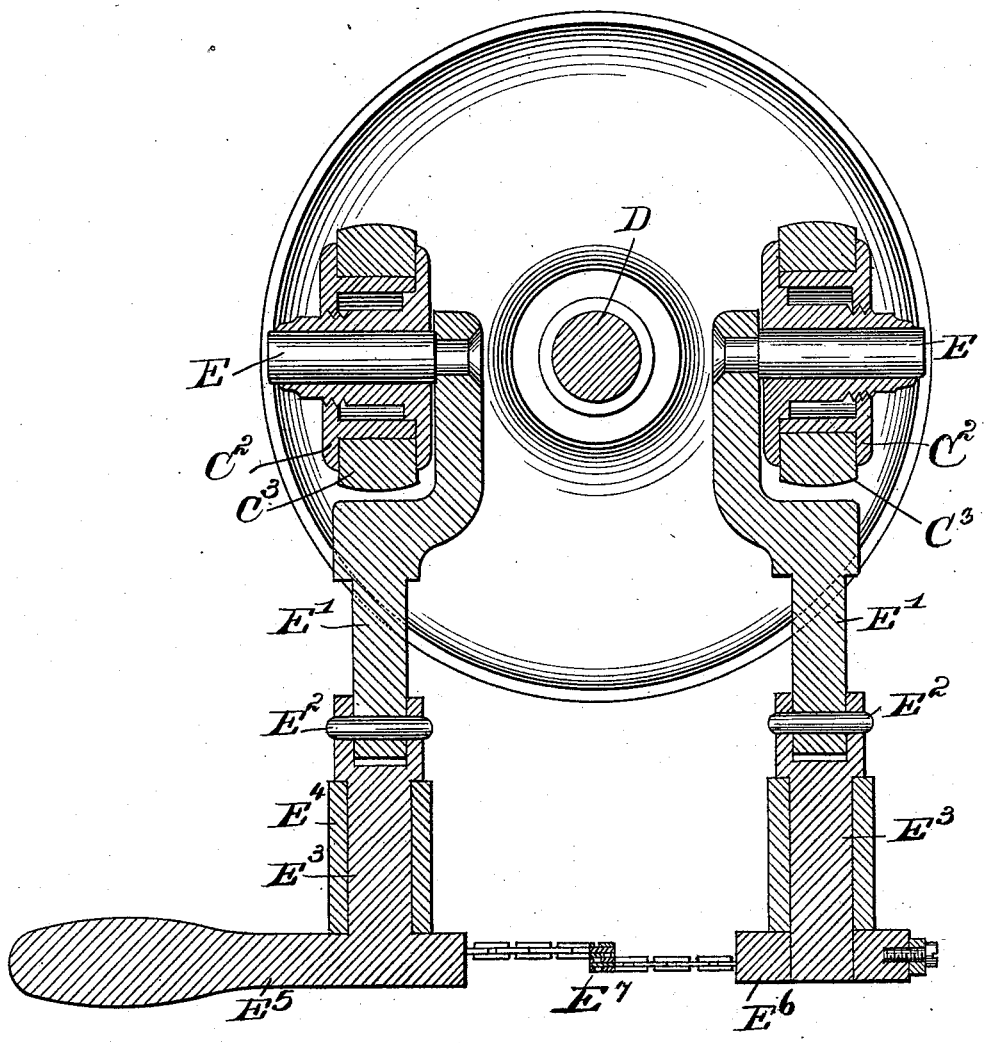

UNITED STATES PATENT OFFICE.

HENRY H. CUMMINGS, OF MALDEN, MASSACHUSETTS.

SPEED-CHANGING AND REVERSING MECHANISM.

SPECIFICATION forming part of Letters Patent No. 529,713, dated November 27, 1894.

Application filed October 30, 1893. Serial No. 489,508. (No model.)

*To all whom it may concern:*

Be it known that I, HENRY H. CUMMINGS, of Malden, county of Middlesex, State of Massachusetts, have invented an Improvement in Speed-Changing and Reversing Mechanism, of which the following description, in connection with the accompanying drawings, is a specification, like letters on the drawings representing like parts.

There are many classes of machines such as lathes, screw-machines, &c., wherein it is desired to drive a shaft faster or slower according to the work to be done, and also to reverse the speed. I have devised a mechanism in which friction is used between the parts rather than toothed gearing, and I have also made the mechanism so that the reverse movement, as when work is not being done, may be made faster than during the direct movement.

Figure 1:
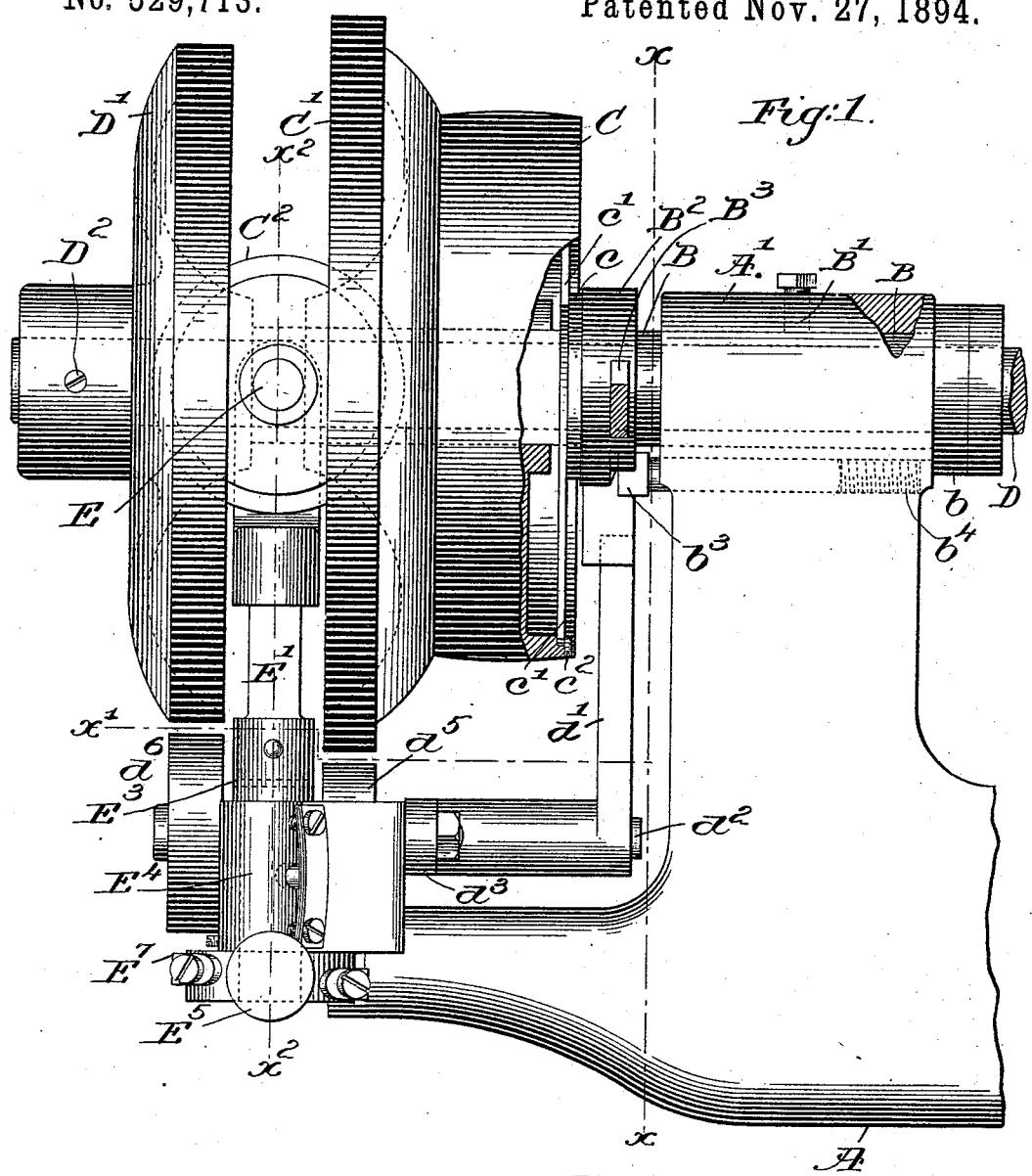
Figure 2:
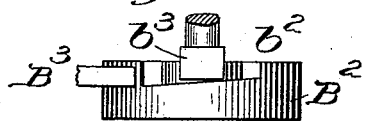
Figure 3:
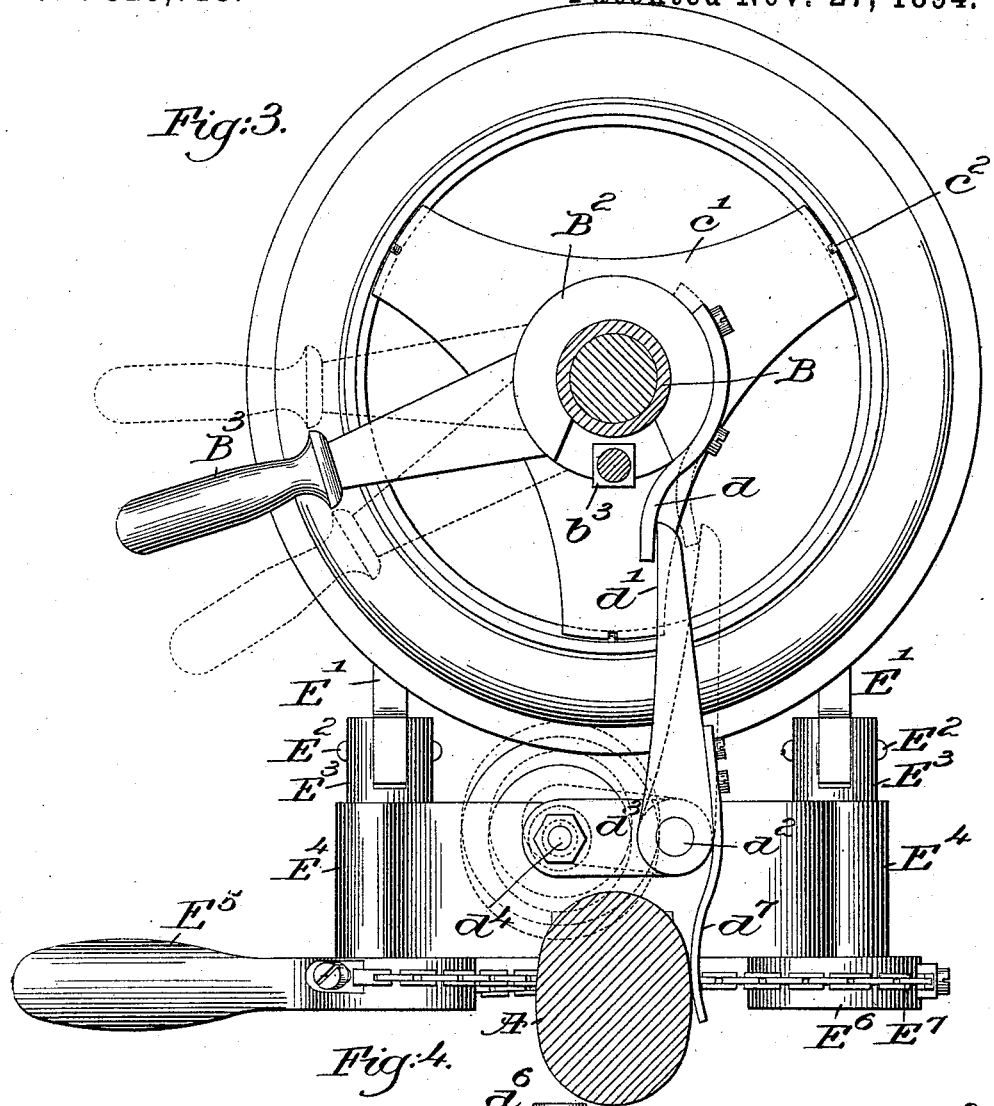
Figure 4:
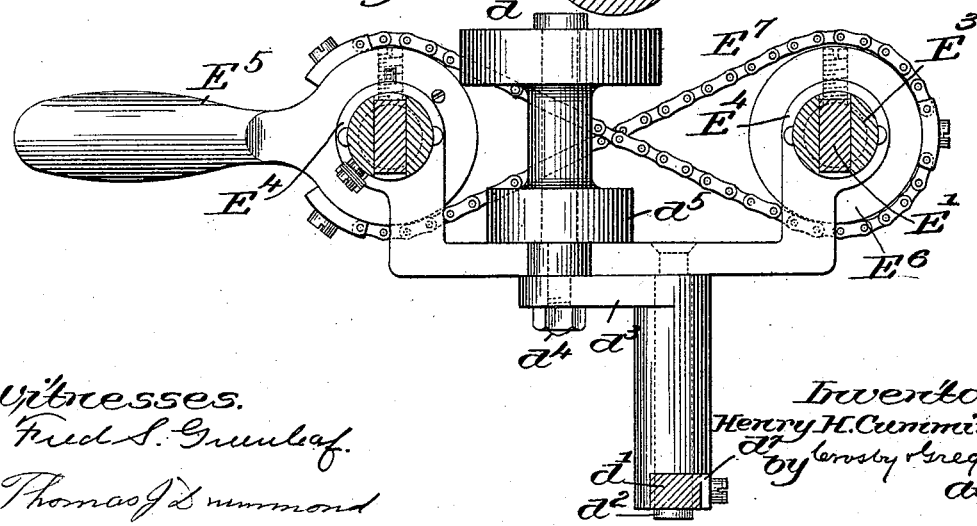

Figure 1 in side elevation partially broken out represents my improved speed changing and reversing mechanism. Fig. 2 is a detail to be referred to. Fig. 3 is a section in the dotted line $x$ Fig. 1 looking to the left. Fig. 4 is a sectional detail below the dotted line $x'$ Fig. 1. Fig. 5 is a section in the line $x^2$, Fig. 1.

Referring to the drawings, let A represent part of the frame-work of a machine, a lathe, screw-machine, or whatever machine to which my invention is to be applied. The framework has a suitable bearing A' in which is clamped a sleeve B, said sleeve being represented chiefly by dotted lines in Fig. 1, the sleeve being held in place in any suitable manner, as for instance, by a set-screw B'. The sleeve referred to has at one end a collar $b$ which rests preferably against the bearing A'. The sleeve is surrounded loosely by a pressure collar $B^2$, shown as provided with a handle $B^3$ by which to turn the pressure collar upon the sleeve, said pressure collar having a suitable cam surface as $b^2$, see Fig. 2, which co-operates with an abutment $b^3$ shown as a headed rod guided in a suitable hole in the frame-work and made adjustable longitudinally in suitable manner as by a screw $b^4$, shown by dotted lines in Fig. 1. To the left of the pressure cam $B^2$, see Fig. 1, is a rawhide washer $c$ it surrounding the sleeve, and next the washer the sleeve has been provided with a spring plate $c'$ represented best in Fig. 3, wherein it is shown as a three-armed spring, the ends of the arms being connected in suitable manner as by screws $c^2$, with the pulley C, and this spring plate may be fixed to or loose on the sleeve as desired. The pulley C also is loose on the sleeve, and said pulley is represented as a belt pulley and adapted to receive a belt from any suitable driving or counter shaft and to be rotated thereby continuously upon or about the stationary sleeve. The belt pulley has connected to or forming part of it a friction pulley C', it having at its face a concaved annular groove adapted to be entered by one or more shiftable friction wheels $C^2$ having preferably non-metallic peripheries, as best represented in Fig. 5.

The sleeve B receives through it and forms a bearing for the shaft D, which is or may be the main or power shaft of the machine to which my invention is to be applied, said shaft extended through said sleeve having fixed upon it by set-screw or otherwise a friction pulley D'. This pulley D' also has a concaved annular groove at its inner face to receive and co-operate with the friction wheels $C^2$. The connection between the hub of the pulley D' and the shaft is made, as herein shown, by suitable set screw $D^2$.

The pressure collar $B^2$, as best shown in Fig. 3, has an attached finger $d$ which is adapted to co-operate with an arm $d'$ of an elbow lever loose on stud $d^2$, said lever having another arm $d^3$ which carries a stud $d^4$ to support two power-transmitting frictional reversing wheels $d^5$, $d^6$, so supported and constructed that they rotate in unison. A spring $d^7$ connected in suitable manner with the lever $d'$ co-operates in such manner with a part of the frame-work as to normally keep the wheels $d^5$, $d^6$ out of engagement with the pulleys C', D', such position of the parts being shown by the full lines in Fig. 3.

When the lever handle $B^3$ is in the position shown by full lines in Fig. 3 it will be supposed that the shaft D is at rest.

The wheels $C^2$ are adapted to rotate freely about studs E carried by arms E' pivoted at $E^2$ on rockers $E^3$, supported in bearings $E^4$ attached to or forming part of the machine, one of said rockers having attached to it a lever $E^5$, while the other has attached to it a disk $E^6$, the said lever and disk being joined, as herein represented, by a belt E⁷ preferably made in the form of a chain, so that when the said lever is moved in one or the other direction the said rockers are turned in unison, so that the peripheries of the friction wheels $C^2$ will be moved toward or from the center of rotation of the shaft D, the said friction wheels when the shaft is being rotated bearing against and being rotated about the studs E, the continuously moving pulley C', then driving, by frictional contact, the pulley D', and the shaft, and as provided for in my application, Serial No. 470,938, it will be understood that the shaft D will be rotated at a slower or faster speed with relation to the speed of rotation of the pulley C', according to the particular position of the wheels $C^2$ in the circular grooves of the said pulleys, or, in other words, the change of position of the said wheels $C^2$ as to their points of contact with the pulleys C' and E' insures the rotation of the shaft E at a faster or a slower speed, as may be desired. When the pressure cam $B^2$ is in the full line position Fig. 3, the friction of the wheels $C^2$ with the pulley C' is not sufficient to rotate the pulley D' and shaft D, but when the handle $B^3$ is lifted from the full line position Fig. 3, the cam $B^2$ by acting against the abutment $b^3$ is moved to the left, viewing Fig. 1, to act against the spring c', thus pressing the pulley C' against the wheels $C^2$, and immediately the wheels $C^2$ are rotated and by their friction they rotate pulley D'. The resilience of the spring, centrifugal action or the pressure of the friction wheels may serve to return the pulley C' when the pressure collar is moved to the right Fig. 1.

When it is desired to reverse the rotation of shaft D the pressure cam $B^2$ may be moved in suitable manner so that the handle $B^3$ will occupy the lower dotted line position Fig. 3. As the cam is so moved the finger d meets the lever d' and causes the two friction wheels $d^5$, $d^6$, to be borne against the pulleys C', D', and the constantly rotating pulley C' will effect the rotation of the connected wheels $d^5$, $d^6$, causing the latter, by engaging pulley D', to rotate said pulley D' and shaft D.

If the two pulleys C', D', were of like diameter, and the wheels $d^5$, $d^6$, of the same diameter, then the reverse motion of shaft D would always be at the same speed as the driving pulley, but in some instances it is desirable to reverse a shaft, or it may be a screw, at a speed more or less rapid with relation to the speed of the loose driving pulley C', and to effect this I have made the pulley C' of greater diameter than pulley D', and the pulley $d^5$ of less diameter than the pulley $d^6$ rotating in unison with it.

Prior to my invention I am not aware that a frictional speed changing mechanism has ever had combined with it frictional reversing mechanism to reverse the direction of rotation of the machine shaft, or it might be a screw-shaft, so this invention is not limited to the exact devices shown for moving the reversing mechanism represented as wheels $d^5$, $d^6$, nor is this invention limited to the exact construction shown for the pressure cam or for the spring back or plate c'.

I have herein shown fast and loose pulleys adapted to be rotated frictionally by a friction wheel between their faces, and in connection with said fast and loose pulleys I have shown reversing devices to rotate the said fast and loose pulleys in a direction opposite that of the friction wheel between them, but I do not herein broadly claim said mechanism, the broad claim therefor being hereby reserved for my application, Serial No. 502,980, filed March 9, 1894.

Having described my invention, what I claim, and desire to secure by Letters Patent, is—

The combination of a shaft to be rotated, a pulley fixed thereon and having a concave groove in one side, a sleeve surrounding said shaft loosely, a friction pulley having a concave face adjacent to the grooved face of the fixed pulley mounted loosely upon said sleeve and adapted to be rotated continuously, a friction wheel interposed between said pulleys and within their grooves, means to move said friction wheel within said grooves toward and from the axes of the pulleys to change speed, a pressure collar surrounding said sleeve and movable toward the loose pulley to move said loose pulley toward the fixed pulley and thereby cause the pinching of the friction wheel by and between the loose and fixed pulleys to communicate rotary motion to said fixed pulley and its shaft, an adjustable and unyielding abutment against which the pressure collar is moved, reversing friction wheels, and means to bring such friction wheels into contact with the peripheries of the pulleys simultaneously with the releasing of the pressure collar and vice versa, substantially as described.

In testimony whereof I have signed my name to this specification in the presence of two subscribing witnesses.

HENRY H. CUMMINGS.

Witnesses:
GEO. W. GREGORY,
LAURA MANIX.